(12) United States Patent
Fisher et al.

(10) Patent No.: US 11,885,174 B2
(45) Date of Patent: Jan. 30, 2024

(54) SOLAR CONTROL COATINGS WITH QUADRUPLE METALLIC LAYERS

(71) Applicant: Vitro Flat Glass LLC, Cheswick, PA (US)

(72) Inventors: Patrick Fisher, Pittsburgh, PA (US); Paul A. Medwick, Wexford, PA (US); Adam D. Polcyn, Pittsburgh, PA (US); Andrew Wagner, Pittsburgh, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

(21) Appl. No.: 17/391,334

(22) Filed: Aug. 2, 2021

(65) Prior Publication Data

US 2021/0355746 A1 Nov. 18, 2021

Related U.S. Application Data

(63) Continuation of application No. 16/265,878, filed on Feb. 1, 2019, now Pat. No. 11,078,718.

(Continued)

(51) Int. Cl.
| | | |
|---|---|---|
| *B32B 15/04* | (2006.01) | |
| *B32B 17/06* | (2006.01) | |
| *E06B 3/67* | (2006.01) | |
| *C03C 17/36* | (2006.01) | |
| *G02B 5/00* | (2006.01) | |
| *G02B 5/20* | (2006.01) | |

(52) U.S. Cl.
CPC ............ *E06B 3/6715* (2013.01); *C03C 17/36* (2013.01); *C03C 17/366* (2013.01); *C03C 17/3639* (2013.01); *C03C 17/3642* (2013.01); *C03C 17/3644* (2013.01); *C03C 17/3649* (2013.01); *C03C 17/3652* (2013.01); *C03C 17/3681* (2013.01); *C03C 17/3689* (2013.01); *G02B 5/003* (2013.01); *G02B 5/208* (2013.01); *C03C 2217/212* (2013.01); *C03C 2217/216* (2013.01); *C03C 2217/256* (2013.01); *C03C 2217/258* (2013.01); *C03C 2218/156* (2013.01); *C03C 2218/322* (2013.01)

(58) Field of Classification Search
CPC .................................................. C03C 17/3649
USPC .................................................. 428/432, 434
See application file for complete search history.

(56) References Cited

U.S. PATENT DOCUMENTS

| | | |
|---|---|---|
| 4,193,236 A | 3/1980 | Mazzoni et al. |
| 4,379,040 A | 4/1983 | Gillery |

(Continued)

FOREIGN PATENT DOCUMENTS

| | | |
|---|---|---|
| CN | 1300327 A | 6/2001 |
| CN | 1524721 A | 9/2004 |

(Continued)

*Primary Examiner* — Lauren R Colgan
(74) *Attorney, Agent, or Firm* — The Webb Law Firm

(57) ABSTRACT

A coated article includes a substrate, a first dielectric layer, a first metallic layer, a second dielectric layer, a second metallic layer, a third dielectric layer, a third metallic layer, a fourth dielectric layer, a fourth metallic layer and a fifth dielectric layer. At least one of the metallic layers is a discontinuous metallic layer having discontinuous metallic regions. An optional primer is positioned over any one of the metallic layers. Optionally a protective layer is provided as the outer most layer over the fifth dielectric layer.

20 Claims, 7 Drawing Sheets

Related U.S. Application Data

(60) Provisional application No. 62/626,332, filed on Feb. 5, 2018.

(56) References Cited

U.S. PATENT DOCUMENTS

| | | |
|---|---|---|
| 4,462,884 A | 7/1984 | Gillery et al. |
| 4,464,874 A | 8/1984 | Shea, Jr. et al. |
| 4,466,562 A | 8/1984 | DeTorre |
| 4,610,771 A | 9/1986 | Gillery |
| 4,671,155 A | 6/1987 | Goldinger |
| 4,746,347 A | 5/1988 | Sensi |
| 4,792,536 A | 12/1988 | Pecoraro et al. |
| 4,806,220 A | 2/1989 | Finley |
| 4,861,669 A | 8/1989 | Gillery |
| 4,898,789 A | 2/1990 | Finley |
| 4,898,790 A | 2/1990 | Finley |
| 4,900,633 A | 2/1990 | Gillery |
| 4,920,006 A | 4/1990 | Gillery |
| 4,938,857 A | 7/1990 | Gillery |
| 5,030,593 A | 7/1991 | Teithoff |
| 5,030,594 A | 7/1991 | Heithoff |
| 5,059,295 A | 10/1991 | Finley |
| 5,088,258 A | 2/1992 | Schield et al. |
| 5,106,663 A | 4/1992 | Box |
| 5,178,966 A | 1/1993 | Gillery |
| 5,240,886 A | 8/1993 | Gulotta et al. |
| 5,328,768 A | 7/1994 | Goodwin |
| 5,385,872 A | 1/1995 | Gulotta et al. |
| 5,393,593 A | 2/1995 | Gulotta et al. |
| 5,418,039 A | 5/1995 | Carter |
| 5,425,861 A | 6/1995 | Hartig et al. |
| 5,492,750 A | 2/1996 | Shumaker, Jr. et al. |
| 5,521,765 A | 5/1996 | Wolfe |
| 5,584,902 A | 12/1996 | Hartig et al. |
| 5,821,001 A | 10/1998 | Arbab et al. |
| 5,916,401 A | 6/1999 | Gannon |
| 5,999,315 A | 12/1999 | Fukano et al. |
| 6,045,896 A | 4/2000 | Boire et al. |
| 6,104,530 A | 8/2000 | Okamura et al. |
| 6,235,398 B1 | 5/2001 | Nakamura et al. |
| 6,353,501 B1 | 3/2002 | Woodruff et al. |
| 6,391,462 B1 | 5/2002 | Jang |
| 6,398,925 B1 | 6/2002 | Arbab et al. |
| 6,495,251 B1 | 12/2002 | Arbab et al. |
| 6,783,876 B2 | 8/2004 | Schicht et al. |
| 6,899,953 B1 | 5/2005 | O'Shaughnessy et al. |
| 6,965,191 B2 | 11/2005 | Koike et al. |
| 7,473,471 B2 | 1/2009 | Finley et al. |
| 7,556,868 B2 | 7/2009 | Thiel et al. |
| 7,659,002 B2 | 2/2010 | Coster et al. |
| 7,897,260 B2 | 3/2011 | Nunez-Regueiro et al. |
| 7,901,781 B2 | 3/2011 | Maschwitz et al. |
| 8,231,977 B2 | 7/2012 | Roquiny et al. |
| 8,592,059 B2 | 11/2013 | Lingle et al. |
| 8,790,796 B2 | 7/2014 | Buhay et al. |
| 8,865,325 B2 | 10/2014 | Polcyn et al. |
| 9,708,215 B2 | 7/2017 | Gerardin et al. |
| 10,345,499 B2* | 7/2019 | Medwick ............. C03C 17/366 |
| 10,562,812 B2 | 2/2020 | Boyce et al. |
| 10,703,673 B2* | 7/2020 | Polcyn ................... C03C 17/36 |
| 11,267,752 B2* | 3/2022 | Polcyn ................. C03C 17/366 |
| 2002/0136905 A1 | 9/2002 | Medwick et al. |
| 2003/0049464 A1 | 3/2003 | Glenn et al. |
| 2003/0186064 A1 | 10/2003 | Murata et al. |
| 2004/0009356 A1 | 1/2004 | Medwick et al. |
| 2004/0033384 A1 | 2/2004 | Funkenbusch et al. |
| 2004/0146645 A1 | 7/2004 | Freeman et al. |
| 2005/0123772 A1 | 6/2005 | Coustet et al. |
| 2005/0208281 A1 | 9/2005 | Decroupet et al. |
| 2006/0083938 A1 | 4/2006 | Kim et al. |
| 2006/0147727 A1 | 7/2006 | Glenn et al. |
| 2007/0082219 A1* | 4/2007 | Fleury ............... B32B 17/10018 428/656 |
| 2007/0116967 A1 | 5/2007 | Medwick et al. |
| 2007/0224432 A1* | 9/2007 | Morimoto ............ H05K 9/0096 428/472 |
| 2007/0242359 A1* | 10/2007 | Thielsch ................ G02B 5/284 359/585 |
| 2007/0281178 A1 | 12/2007 | Oh et al. |
| 2007/0298265 A1 | 12/2007 | Morimoto et al. |
| 2008/0118762 A1* | 5/2008 | Morimoto ............ H05K 9/0096 428/457 |
| 2008/0174872 A1* | 7/2008 | Morimoto ............... G02B 5/208 359/585 |
| 2008/0187692 A1 | 8/2008 | Roquiny et al. |
| 2009/0015909 A1 | 1/2009 | Fleury et al. |
| 2009/0092825 A1 | 4/2009 | Chang et al. |
| 2009/0142602 A1 | 6/2009 | Medwick et al. |
| 2009/0297864 A1 | 12/2009 | Lingle et al. |
| 2010/0046191 A1 | 2/2010 | den Boer et al. |
| 2010/0279144 A1 | 11/2010 | Frank et al. |
| 2010/0316886 A1 | 12/2010 | Rashid et al. |
| 2011/0117300 A1 | 5/2011 | Wagner |
| 2011/0169402 A1 | 7/2011 | Lingle et al. |
| 2011/0236715 A1* | 9/2011 | Polcyn ................... C03C 17/366 428/209 |
| 2011/0261442 A1 | 10/2011 | Knoll et al. |
| 2011/0262726 A1 | 10/2011 | Knoll et al. |
| 2011/0268941 A1* | 11/2011 | Fischer ................... G02B 5/282 204/192.1 |
| 2012/0207923 A1 | 8/2012 | Baumgartner |
| 2014/0087160 A1 | 3/2014 | McSporran et al. |
| 2014/0272453 A1 | 9/2014 | Polcyn et al. |
| 2015/0004383 A1* | 1/2015 | Sandre-Chardonnal ..................... C03C 17/3657 428/213 |
| 2015/0185382 A1* | 7/2015 | Leyder .................. C23C 28/345 359/359 |
| 2016/0223729 A1* | 8/2016 | Medwick ............. C03C 17/3644 |
| 2017/0059753 A1 | 3/2017 | Wagner et al. |
| 2018/0148371 A1 | 5/2018 | Polcyn et al. |
| 2019/0023610 A1 | 1/2019 | Fischer et al. |
| 2019/0276352 A1* | 9/2019 | Polcyn ................... C03C 17/36 |

FOREIGN PATENT DOCUMENTS

| | | |
|---|---|---|
| CN | 1906136 A | 1/2007 |
| CN | 101679112 A | 3/2010 |
| CN | 102046553 A | 5/2011 |
| CN | 105189394 A | 12/2015 |
| EP | 3124450 A1 | 2/2017 |
| JP | 362174189 A | 7/1987 |
| JP | 2000192227 A | 7/2000 |
| JP | 2001353810 A | 12/2001 |
| JP | 2002533565 A | 10/2002 |
| KR | 1020070104672 A | 10/2007 |
| KR | 1020110128285 A | 11/2011 |
| KR | 1020120016129 A | 2/2012 |
| KR | 1020130002337 A | 1/2013 |
| RU | 2152911 C2 | 7/2000 |
| WO | 9613379 A1 | 5/1996 |
| WO | 0029346 A1 | 5/2000 |
| WO | 2008149969 A1 | 12/2008 |
| WO | 2012143704 A1 | 10/2012 |
| WO | 2013189798 A1 | 12/2013 |
| WO | 2014080141 A1 | 5/2014 |
| WO | 2014164695 A1 | 10/2014 |
| WO | 2015129611 A1 | 9/2015 |
| WO | 2016126758 A1 | 8/2016 |
| WO | 2017198362 A1 | 11/2017 |

* cited by examiner

SOLAR CONTROL COATINGS WITH QUADRUPLE METALLIC LAYERS

CROSS REFERENCE TO RELATED APPLICATIONS

This application is a continuation of U.S. patent application Ser. No. 16/265,878 filed Feb. 1, 2019, which claims priority to U.S. Provisional Patent Application No. 62/626,332, filed on Feb. 5, 2018, the disclosures of which are hereby incorporated by reference in their entireties.

BACKGROUND OF THE INVENTION

Field of the Invention

This invention relates generally to solar control coatings with four metallic layers.

Technical Considerations

Solar control coatings are known in the fields of architectural and vehicle transparencies. These solar control coatings block or filter selected ranges of electromagnetic radiation, such as in the range of solar infrared or solar ultraviolet radiation, to reduce the amount of solar energy entering the vehicle or building. This reduction of solar energy transmittance helps reduce the load on the cooling units of the vehicle or building.

SUMMARY OF THE INVENTION

A coating of the invention includes a coating over at least a portion of a substrate. The coating includes at least three continuous metallic layers and at least one discontinuous metallic layer. The discontinuous metallic layer increases the visible light absorption of the coating and, in combination with dielectric layers of appropriate thickness, can also provide the coated article with asymmetrical reflectance.

A coating of the invention includes a coating over at least a portion of a substrate. The coating includes at least four metallic layers alternating with at least five dielectric layers wherein at least one of the metallic layers comprising a discontinuous metallic layer having discontinuous metal regions.

A coated article of the invention includes a substrate and a coating formed over at least a portion of the substrate. The coating includes a first dielectric layer formed over at least a portion of the substrate; a first metallic layer formed over at least a portion of the first dielectric layer; a second dielectric layer formed over at least a portion of the first metallic layer; a second metallic layer formed over at least a portion of the second dielectric layer; a third dielectric layer formed over at least a portion of the second metallic layer; a third metallic layer formed over at least a portion of the third dielectric layer; a fourth dielectric layer formed over at least a portion of the third metal layer; a fourth metallic layer formed over at least a portion of the fourth dielectric layer; a fifth dielectric layer formed over at least a portion of the fourth metallic layer; and an optional protective layer formed over at least a portion of the third metallic layer. At least one of the metallic layers is a discontinuous layer. For example, the second metallic layer or the third metallic layer can be a discontinuous layer.

An additional coated article includes a substrate and a coating stack over at least a portion of the substrate. The coating includes a first dielectric layer formed over at least a portion of the substrate. The first dielectric layer comprises a first film and a second film over the first film. A first metallic layer is positioned over the first dielectric layer. An optional first primer layer is positioned over the first metallic layer. A second dielectric layer is positioned over the optional first primer layer or the first metallic layer. The second dielectric layer comprises a first film and a second film over the first film. Optionally a third film is positioned over the second film. A second metallic layer is positioned over the second dielectric layer. A third dielectric layer is positioned over the second metallic layer. The third dielectric layer comprises a first film and a second film over the first film. Optionally, a third film (of the third dielectric layer) can be positioned over the second film. A third metallic layer is positioned over the third dielectric layer. A fourth dielectric layer comprising first film and a second film over the first film is positioned over the third metallic layer. Optionally, a third film (of the fourth dielectric layer) can be positioned over the second film. A fourth metallic layer is positioned over the fourth dielectric layer. An optional fourth primer layer is positioned over the fourth metallic layer. A fifth dielectric layer comprising a first film and a second film positioned over the first film is positioned over the fourth metallic layer. At least one of the metallic layers is a discontinuous layer having discontinuous metallic regions. For example, the second metallic layer or the third metallic layer is a discontinuous layer having discontinuous metallic regions.

A method of making a coated article including providing a substrate. A first dielectric layer is applied over at least a portion of the substrate. A first metallic layer is applied over at least a portion of the first dielectric layer. An optional first primer layer is applied over at least a portion of the first metallic layer. A second dielectric layer is applied over at least a portion of the optional first primer layer or the first metallic layer. A second metallic layer is applied over at least a portion of the second dielectric layer. A third dielectric layer is applied over at least a portion of the optional second primer layer or the second metallic layer. A third metallic layer is applied over at least a portion of the third dielectric layer. A fourth dielectric layer is applied over at least a portion of the optional third primer layer or the third metallic layer. A fourth metallic layer is applied over at least a portion of the fourth dielectric layer. A fifth dielectric layer is applied over at least a portion of the optional fourth primer layer or the fourth metallic layer. At least one of the metallic layers is a discontinuous layer having discontinuous metallic regions. For example, the second metallic layer or the third metallic layer is a subcritical metallic layer having discontinuous metallic regions. The optional primer immediately over the discontinuous layer can be absent.

Another embodiment of the invention is an architectural transparency. The transparency has a first ply having a number 1 surface and a number 2 surface and a second ply having a number 3 surface and a number 4 surface. A coating, as described herein, is positioned over at least a portion of the number 2 surface or the number 3 surface.

Another embodiment of the invention is a method of making an architectural transparency. The method includes providing a first ply having a number 1 surface and a number 2 surface, and a second ply having a number 3 surface and a number 4 surface. Either the number 2 surface of the first ply or the number 3 surface of the second ply have a coating as described herein. The first ply and the second ply are assembled so that the number 2 surface faces the number three surface and that there is a space between the number 2 surface and the number 3 surface. The space is filled with a gas.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
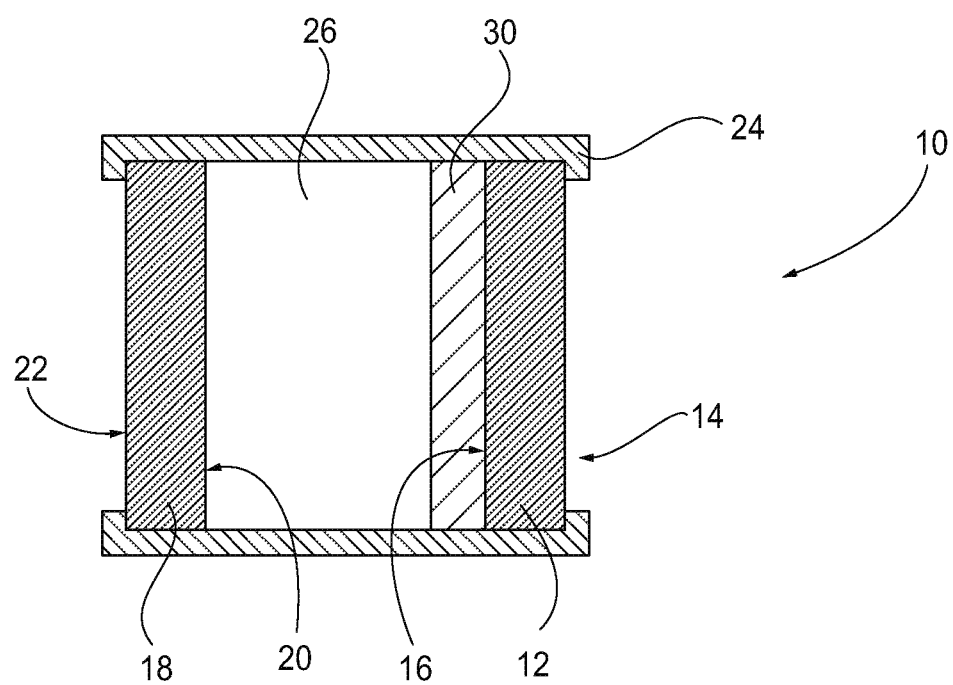
FIG. 1 is a side view (not to scale) of an insulating glass unit (IGU) having a coating of the invention.
Figure 2:
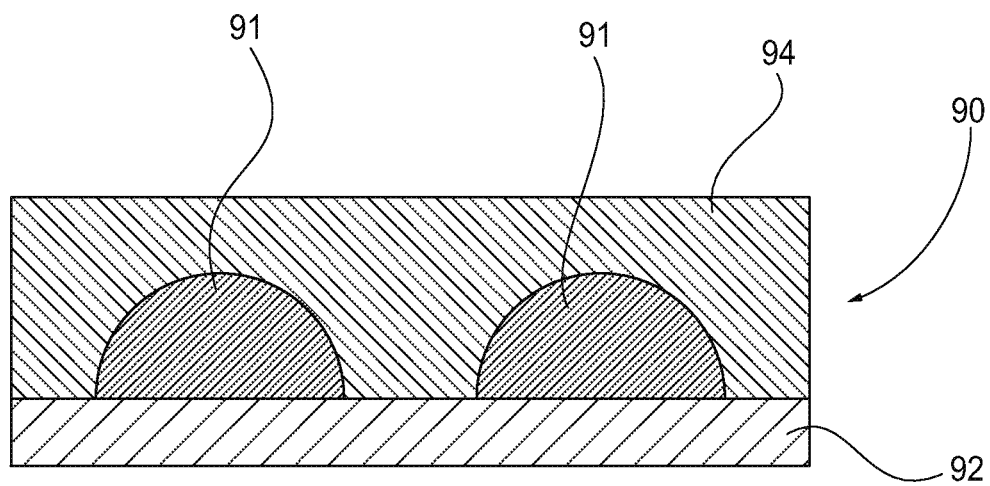
FIG. 2 is a side, sectional view (not to scale) of a subcritical metal layer with a primer layer.
Figure 3:
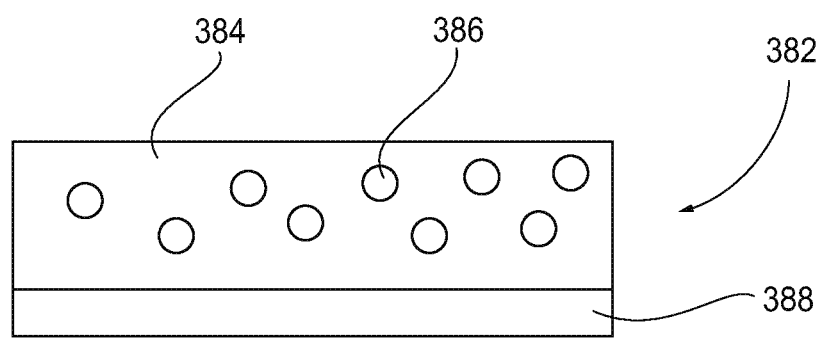
FIG. 3 is a side, sectional view (not to scale) of a further coating of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side. The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands.

For purposes of the following discussion, the invention will be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the invention is not limited to use with such architectural transparencies but could be practiced with transparencies in any desired field, such as, but not limited to, laminated or non-laminated residential and/or commercial windows, insulating glass units, and/or transparencies for land, air, space, above water and underwater vehicles. Therefore, it is to be understood that the specifically disclosed exemplary embodiments are presented simply to explain the general concepts of the invention, and that the invention is not limited to these specific exemplary embodiments. Additionally, while a typical "transparency" can have sufficient visible light transmission such that materials can be viewed through the transparency, in the practice of the invention, the "transparency" need not be transparent to visible light but may be translucent or opaque.

A non-limiting transparency 10 incorporating features of the invention is illustrated in FIG. 1. The transparency 10 can have any desired visible light, infrared radiation, or ultraviolet radiation transmission and/or reflection. For example, the transparency 10 can have a visible light transmission of any desired amount, e.g., greater than 0% up to 100%.

The exemplary transparency 10 of FIG. 1 is in the form of a conventional insulating glass unit and includes a first ply 12 with a first major surface 14 (No. 1 surface) and an opposed second major surface 16 (No. 2 surface). In the illustrated non-limiting embodiment, the first major surface 14 faces the building exterior, i.e., is an outer major surface, and the second major surface 16 faces the interior of the building. The transparency 10 also includes a second ply 18 having an outer (first) major surface 20 (No. 3 surface) and an inner (second) major surface 22 (No. 4 surface) and spaced from the first ply 12. This numbering of the ply surfaces is in keeping with conventional practice in the fenestration art. The first and second plies 12, 18 can be connected together in any suitable manner, such as by being adhesively bonded to a conventional spacer frame 24. A gap or chamber 26 is formed between the two plies 12, 18. The chamber 26 can be filled with a selected atmosphere, such as air, or a non-reactive gas such as argon or krypton gas. A solar control coating 30 (or any of the other coatings described below) is formed over at least a portion of one of the plies 12, 18, such as, but not limited to, over at least a portion of the No. 2 surface 16 or at least a portion of the No. 3 surface 20. Although, the coating could also be on the No. 1 surface or the No. 4 surface, if desired. Examples of insulating glass units are found, for example, in U.S. Pat. Nos. 4,193,236; 4,464,874; 5,088,258; and 5,106,663.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmission of greater than 0% up to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The first and second plies 12, 18 can each be, for example, clear float glass or can be tinted or colored glass or one ply 12, 18 can be clear glass and the other ply 12, 18 colored glass. Although not limiting to the invention, examples of glass suitable for the first ply 12 and/or second ply 18 are described in U.S. Pat. Nos. 4,746,347; 4,792,536; 5,030,593; 5,030,594; 5,240,886; 5,385,872; and 5,393,593. The first and second plies 12, 18 can be of any desired dimensions, e.g., length, width, shape, or thickness. In one exemplary automotive transparency, the first and second plies can each be 1 mm to 10 mm thick, such as 1 mm to 8 mm thick, such as 2 mm to 8 mm, such as 3 mm to 7 mm, such as 5 mm to 7 mm, such as 6 mm thick.

The solar control coating 30 of the invention is deposited over at least a portion of at least one major surface of one of the glass plies 12, 18. In the example shown in FIG. 1, the coating 30 is formed over at least a portion of the inner surface 16 of the outboard glass ply 12. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity; etc. The solar control coating 30 can block, absorb, or filter selected portions of the solar spectrum, such as, but not limited to, the IR, UV, and/or visible spectrums.

The solar control coating 30 can be deposited by any conventional method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the coating 30 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

Figure 4:
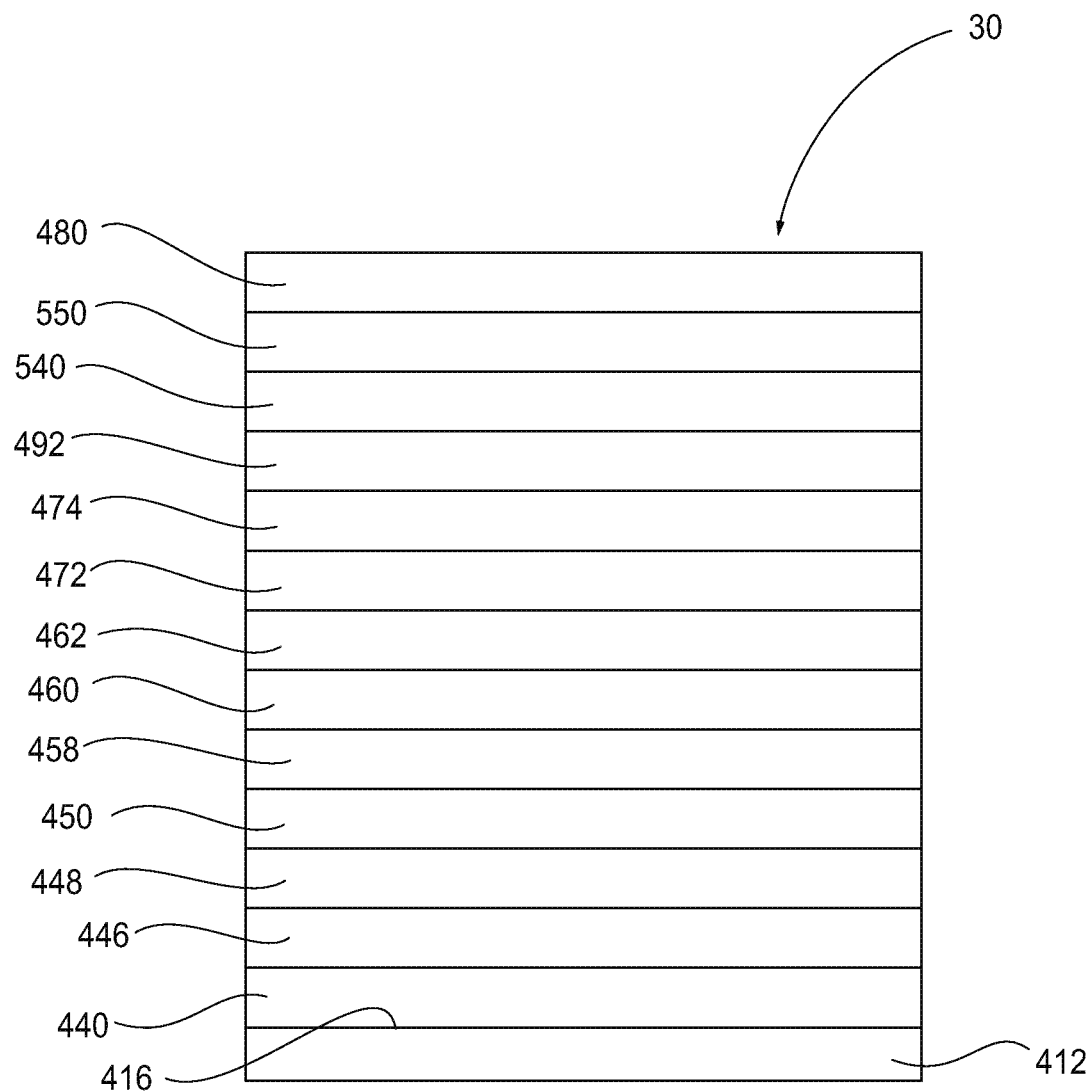
FIG. 4 is a sectional view (not to scale) of a coating of the invention.

An exemplary non-limiting solar control coating 30 of the invention is shown in FIG. 4. This exemplary coating 30 includes a base layer or first dielectric layer 440 deposited over at least a portion of a major surface of a substrate (e.g., the No. 2 surface 416 of the first ply 12). The first dielectric layer 440 can be a single layer or can comprise more than one film of antireflective materials and/or dielectric materials, such as, but not limited to, metal oxides, oxides of metal alloys, nitrides, oxynitrides, or mixtures thereof. The first dielectric layer 440 can be transparent to visible light. Examples of suitable metal oxides or metal nitrides for the first dielectric layer 440 or any film therein include oxides, nitrides or oxynitrides of titanium, hafnium, zirconium, niobium, zinc, bismuth, lead, indium, tin, aluminum, silicon and mixtures thereof. The metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 440 can be a substantially single phase film, such as a metal alloy oxide film, e.g., zinc stannate, or can be a mixture of phases composed of zinc and tin oxides or can be composed of a plurality of films.

Figure 5:
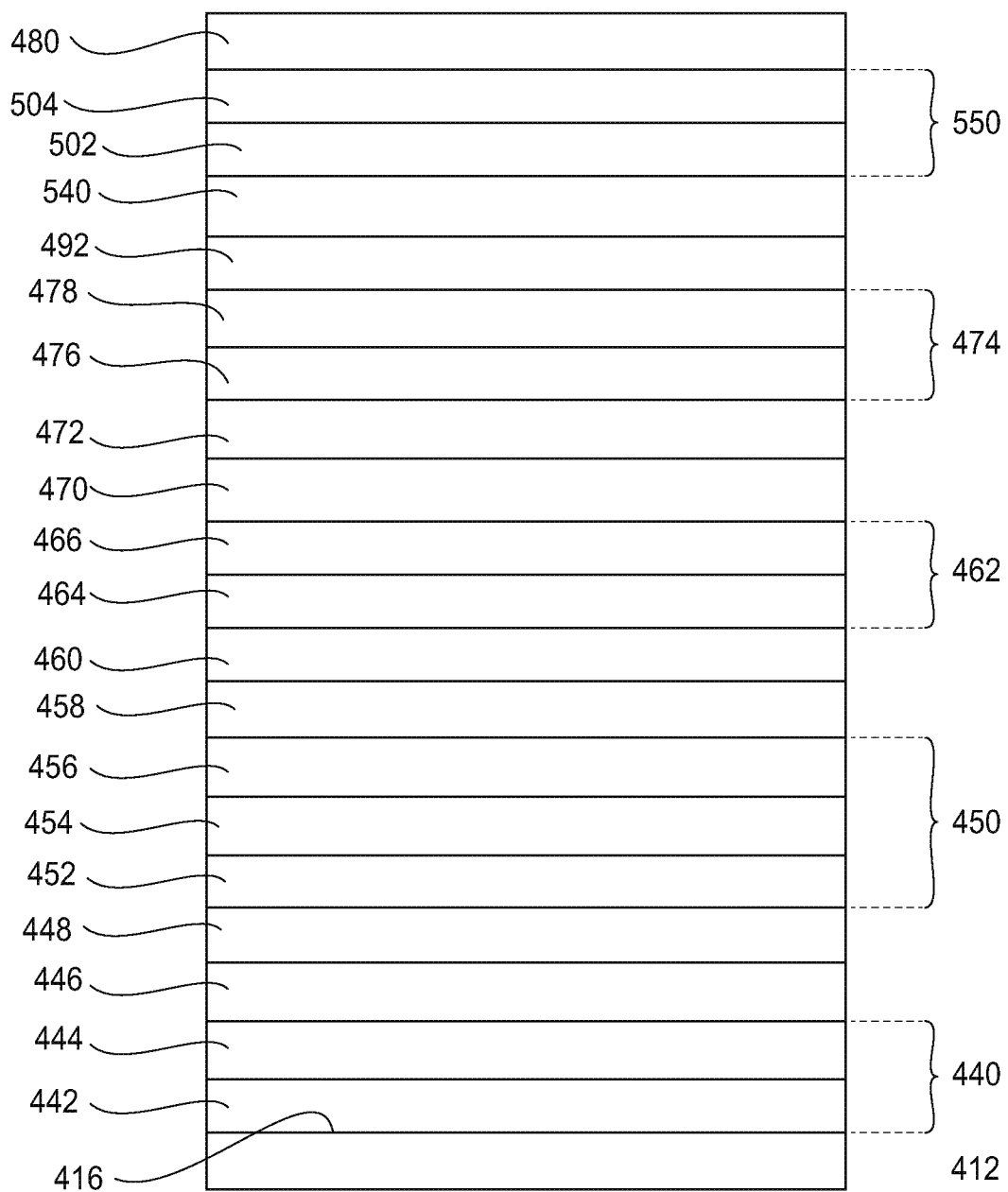
FIG. 5 is a sectional view (not to scale) of the coating of the invention.
Figure 6:
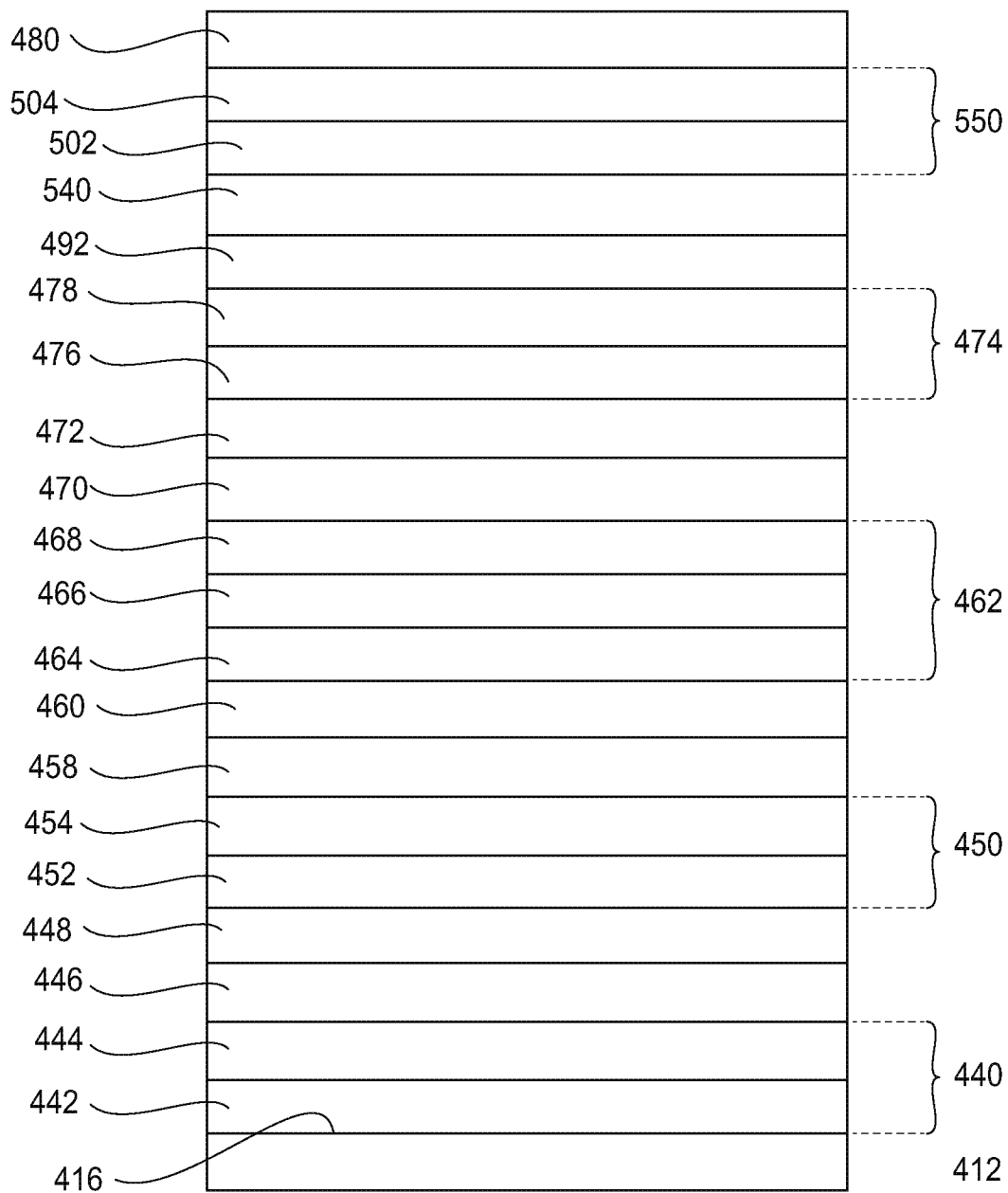
FIG. 6 is a sectional view (not to scale) of the coating of the invention.
Figure 7:
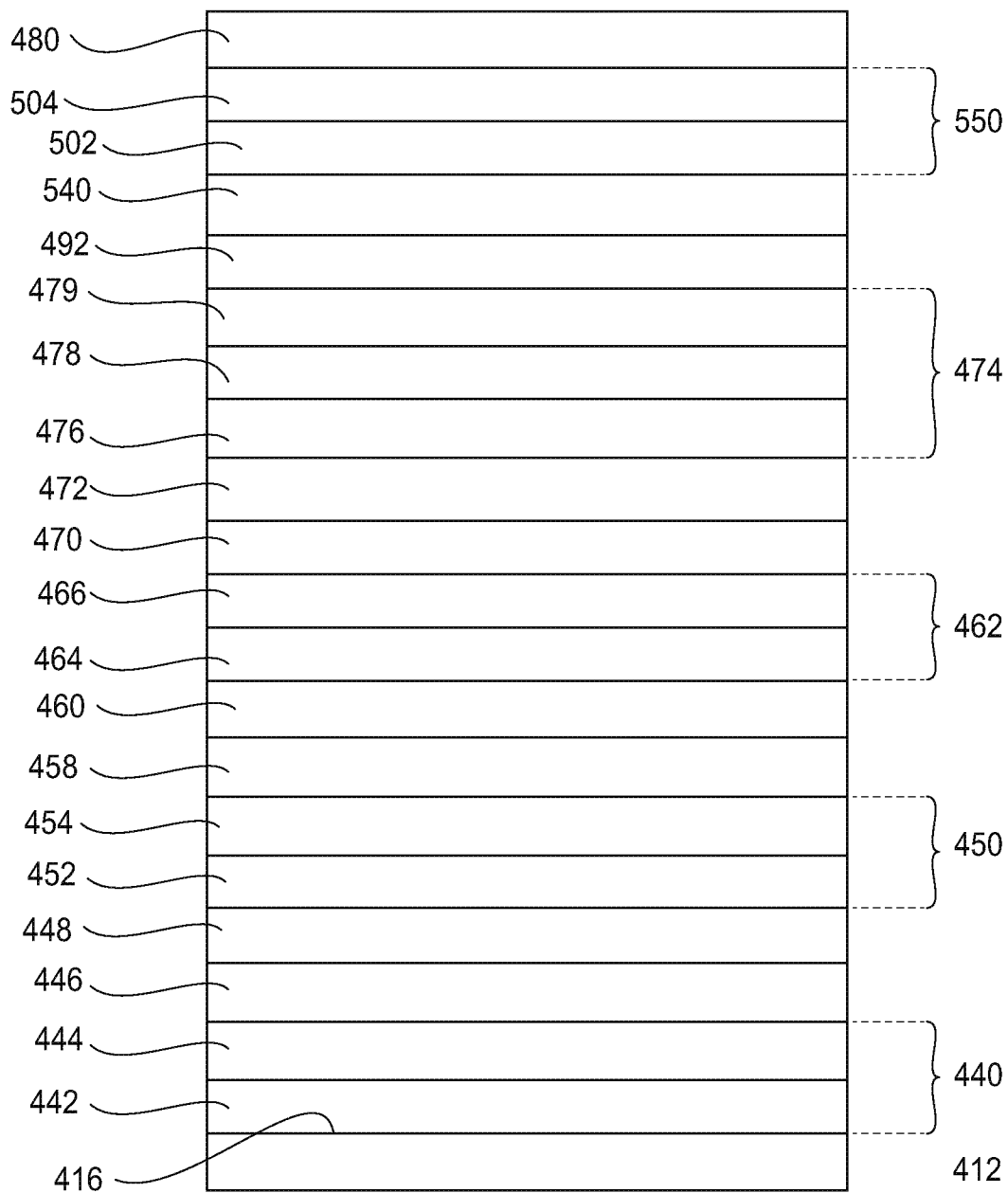
FIG. 7 is a sectional view (not to scale) of the coating of the invention.

As shown in FIG. 5, the first dielectric layer 440 can comprise a multi-film structure having a first film 442, e.g., a metal alloy oxide film, deposited over at least a portion of a substrate (such as the inner major surface 16 of the first ply 12) and a second film 444, e.g., a metal oxide or oxide mixture film, deposited over the first film 442. In one non-limiting embodiment, the first film 442 can be a zinc/tin alloy oxide. By "zinc/tin alloy oxide" is meant both true alloys and also mixtures of the oxides. The zinc/tin alloy oxide can be that obtained from magnetron sputtering vacuum deposition from a cathode of zinc and tin. One non-limiting cathode can comprise zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. One suitable metal alloy oxide that can be present in the first film 442 is zinc stannate. By "zinc stannate" is meant a composition of $Zn_xSn_{1-x}O_{2-x}$ (Formula 1) where "x"

varies in the range of greater than 0 to less than 1. For instance, "x" can be greater than 0 and can be any fraction or decimal between greater than 0 to less than 1. For example, where x=⅔, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film.

The second film 444 can be a metal oxide film, such as zinc oxide. The zinc oxide can be deposited from a zinc cathode that includes other materials to improve the sputtering characteristics of the cathode. For example, the zinc cathode can include a small amount (e.g., up to 20 wt. %, up to 15 wt. %, up to 10 wt. %, or up to 5 wt. %) of tin to improve sputtering. In which case, the resultant zinc oxide film would include a small percentage of tin oxide, e.g., up to 10 wt. % tin oxide, e.g., up to 5 wt. % tin oxide. A coating layer deposited from a zinc cathode having up to 10 wt. % tin (added to enhance the conductivity of the cathode) is referred to herein as "a zinc oxide film" even though a small amount of tin may be present. The small amount of tin in the cathode (e.g., less than or equal to 10 wt. %, such as less than or equal to 5 wt. %) is believed to form tin oxide in the predominantly zinc oxide second film 44.

A first metallic layer 446 can be deposited over the first dielectric layer 440. The first metallic layer 446 can include a reflective metal, such as, but not limited to, metallic gold, copper, palladium, aluminum, silver, or mixtures, alloys, or combinations thereof. In one embodiment, the reflective metal is silver or copper. In another embodiment, the first metallic layer 446 has contains silver and copper. The first metallic layer 446 can be a continuous layer. Alternatively, the first metallic layer 446 can be a discontinuous layer. The first metallic layer 446 can have a thickness of less than 250 Å, preferable less than 200 Å, more preferably less than 125 Å, most preferably less than 100 Å; and/or greater than 50 Å; preferably greater than 60 Å; more preferably greater than 65 Å; most preferably greater than 70 Å. In one embodiment, the first metallic layer 446 has a thickness of 78 Å to 121 Å. In another embodiment, the first metallic layer 446 has a thickness of 70 Å to 99 Å.

An optional first primer layer 448 can be located over the first metallic layer 446. The optional first primer layer 448 can be a single film or a multiple film layer. The optional first primer layer 448 can include an oxygen-capturing material that can be sacrificial during the deposition process to prevent degradation or oxidation of the first metallic layer 446 during the sputtering process or subsequent heating processes. The optional first primer layer 448 can also absorb at least a portion of electromagnetic radiation, such as visible light, passing through the coating 30. Examples of materials useful for the optional first primer layer 448 include titanium, silicon, silicon dioxide, silicon nitride, silicon oxynitride, nickel-chrome alloys (such as Inconel), zirconium, aluminum, alloys of silicon and aluminum, alloys containing cobalt and chromium (e.g., Stellite®), and mixtures thereof. For example, the optional first primer layer 448 can be titanium or an alloy or mixture of titanium and aluminum.

A second dielectric layer 450 is located over the first metallic layer 446 or over the optional first primer layer 448. The second dielectric layer 450 can comprise one or more metal oxide or metal alloy oxide-containing films, such as those described above with respect to the first dielectric layer 440. With reference to FIG. 5, for example, the second dielectric layer 450 can include a first film 452, e.g., a zinc oxide film, deposited over first metallic layer 446 or the optional first primer film 448 and a second film 454, e.g., a zinc stannate ($Zn_2SnO_4$) film, deposited over the first film 452. An optional third film 456, e.g., a second zinc oxide film, can be deposited over the second film.

A second metallic layer 458 is located over the second dielectric layer 450 (e.g., over the second zinc oxide film 456, if present, or over the zinc stannate film 454 if not). The metallic material can be metallic gold, copper, palladium, aluminum, silver, or mixtures, alloys, or combinations thereof. It can be applied as a continuous layer or as a discontinuous layer such that isolated regions or islands of the material are formed rather than a continuous layer of the material. The second metallic layer 458 can have a thickness of that is thicker than the first metallic layer 446. The second metallic layer 458 can have a thickness that is at least 70 Å, preferably at least 100 Å, more preferably at least 125 Å, most preferably at least 128 Å; and/or at most 250 Å, preferably at most 225 Å, more preferably at most 200 Å, most preferably at most 191 Å.

An optional second primer layer 460 can be deposited over the second metallic layer 458. The optional second primer layer 460 can be as described above with respect to the optional first primer layer 448. In one example, the optional second primer layer 460 can be titanium. Any of the primer layers can be sputtered in a non-reactive atmosphere, such a low oxygen or oxygen free atmosphere. Then, the coated article could be subjected to further processing, such as the deposition of further oxide layers in an oxygen containing atmosphere. During this further deposition, the primer would oxidize.

A third dielectric layer 462 can be deposited over the second metallic layer 458 (e.g., over the optional second primer film 460). The third dielectric layer 462 can also include one or more metal oxide or metal alloy oxide-containing layers, such as discussed above with respect to the first and second dielectric layers 440, 450. The third dielectric layer 462 can include a first film 464, e.g., a zinc oxide film, a second film 466, e.g., a zinc stannate film deposited over the first film 464. An optional third film 468, e.g., a second zinc oxide layer, can be deposited over the second film.

A third metallic layer 470 is deposited over the third dielectric layer 462. The third metallic layer 470 can be of any of the materials discussed above with respect to the first metallic layer 446. In one non-limiting example, the third metallic layer 470 includes silver, copper, or silver and copper. The third metallic layer 470 is a continuous layer. Alternatively, the third metallic layer 470 can be a discontinuous layer. The third metallic layer 470 can be thinner that the second metallic layer 458. The third metallic layer can have a thickness of at least a thickness of less than 250 Å, preferable less than 200 Å, more preferably less than 125 Å, most preferably less than 100 Å; and/or greater than 50 Å; preferably greater than 60 Å; more preferably greater than 65 Å; most preferably greater than 70 Å. In one embodiment, the first metallic layer 446 has a thickness of 97 Å to 105 Å. In another embodiment, the first metallic layer 446 has a thickness of 70 Å to 125 Å.

An optional third primer layer 472 is located over the third metallic layer 470. The optional third primer layer 472 can be as described above with respect to the optional first or second primer layers 448 or 460.

A fourth dielectric layer 474 is located over the third metallic layer 470 (e.g., over the optional third primer layer 472). The fourth dielectric layer 474 can be comprised of one or more metal oxide or metal alloy oxide-containing layers, such as those discussed above with respect to the first, second, or third dielectric layers 440, 450, 462. In one non-limiting example, the fourth dielectric layer 474 is a multi-film layer having a first film 476 deposited over the third metallic layer 470 or third primer layer 472, and a second film 478 deposited over the first film 476. An optional third film 479 can be deposited over the second film.

A fourth metallic layer 492 is located over the fourth dielectric layer 474. The fourth metallic layer 492 can include a reflective metal, such as, but not limited to, metallic gold, copper, palladium, aluminum, silver, or mixtures, alloys, or combinations thereof. In one embodiment, the reflective metal is silver, copper or a combination of silver and copper. In one embodiment, the fourth metallic layer 492 has contains silver and copper. The fourth metallic layer 492 can be a continuous layer or a discontinuous layer. The fourth metallic layer 492 can be thicker than the first metallic layer 446. The fourth metallic layer 492 can also be thicker than the third metallic layer 470. The fourth metallic layer can have a thickness of at least 100 Å, preferably at least 150 Å, more preferably at least 175 Å, most preferably at least 181 Å; and/or at most 300 Å, preferably at most 275 Å, more preferably 250 Å, most preferably at most 240 Å.

An optional fourth primer layer 540 can be deposited over the fourth metallic layer 492. The fourth primer layer 540 can be as described above with respect to the optional first primer layer 448, second primer layer 460 or third primer layer 472. In one example, the optional fourth primer layer 540 can be titanium.

A fifth dielectric layer 550 is located over the fourth metallic layer 492 (e.g., over the optional fourth primer layer 540). The fifth dielectric layer 550 can be comprised of one or more metal oxide or metal alloy oxide-containing layers, such as those discussed above with respect to the first, second, third or fourth dielectric layers 440, 450, 462, 474. In one non-limiting example, the fifth dielectric layer 550 is a multi-film layer having a first film 502 deposited over the fourth primer layer 540 or fourth metallic layer 492, and a second film 504 deposited over the first film 502.

In another non-limiting example, the fifth dielectric layer 550 has first film 502 and a second film 504. The first film comprises zinc oxide. The second film comprises silicon nitride.

In another non-limiting example, the fifth dielectric layer 550 has a first film 502, a second film 504 and a third film (not shown). The first film 502 comprises zinc oxide or zinc stannate. The second film 504 comprises zinc stannate, silicon oxide, or silicon oxynitride. The third film comprises silicon nitride. Silicon oxide, silicon oxynitrides and silicon nitride can contain aluminum, such as aluminum oxide or aluminum nitride, in amounts of up to 5 weight percent, up to 10 weight percent, up to 15 weight percent or up to 20 weight percent. In one embodiment, the second film 504 and the third film are a gradient layer from silicon oxide or silicon oxynitrides to silicon nitride.

An optional overcoat 480 can be located over the fifth dielectric layer 550. The overcoat 480 can help protect the underlying coating layers from mechanical and chemical attack. The optional overcoat 480 can be, for example, a metal oxide or metal nitride layer. For example, the optional overcoat 480 can be titania, or a mixture of titania and alumina. Other materials useful for the overcoat include other oxides, such as silica, alumina, or a mixture of silica and alumina.

In one non-limiting embodiment, the transparency has a visible light transmittance of greater than 20%, such as greater than 30%, such as greater than 34%. The transparency has a solar heat gain coefficient (SHGC) of less than 0.3, such as less than 0.27, such as less than 0.25, such equal to or as less than 0.22, such as less than 0.20, such as less than 0.19; and/or at least 0.10; at least 0.12; at least 0.15; or at least 0.17. The transparency has a light to solar gain ratio (LSG) of at least 1.7, at least 1.75, at least 1.8, or at least 1.85; and/or at most 2.25; at most 2.15; at most 2.10; or at most 2.06.

Any one of the first metallic layer 446, the second metallic layer 458, the third metallic layer 470 and the fourth metallic layer 492 can be a discontinuous layer. In one embodiment, only the second metallic layer or only the third metallic layer is a discontinuous layer. In another embodiment, only the third metallic layer is the discontinuous layer. In another embodiment, only the second metallic layer is the discontinuous layer.

The coated article can have a total thickness of all the metallic layers (e.g. total thickness being the combine thickness of first, second, third and fourth metallic layers). This total thickness can be in the range of 200 Å to 750 Å, preferably 225 Å to 650 Å, more preferably 250 Å to 600 Å, most preferably 252 Å to 582 Å. The coated article can have a total thickness of all of the metallic layers which are continuous layers (i.e. excluding the thickness of the discontinuous layer(s)). The total thickness of all of the continuous layers can be in the range of 150 Å to 750 Å, preferably 200 Å to 650 Å, more preferably 225 Å to 575 Å, most preferably 237 Å to 563 Å.

The coated article can have a single discontinuous metallic layer wherein all other metallic layers are continuous metallic layers.

A primer, such as any of the primers described above, may be positioned over and in direct contact with any of the metallic layers. The primer may be a mixture of titanium and aluminum.

The invention further relates to a method of making a coated article. A method includes providing a substrate. A first dielectric layer is applied over at least a portion of the substrate. A first metallic layer is applied over at least a portion of the first dielectric layer. A second dielectric layer is applied over at least a portion of the first metallic layer. A second metallic layer is applied over at least a portion of the second dielectric layer. A third dielectric layer is applied over at least a portion of the second metallic layer. A third metallic layer is applied over at least a portion of the third dielectric layer. A fourth dielectric layer is applied over at least a portion of the fourth metallic layer. A fifth dielectric layer is applied over at least a portion of the fourth metallic layer. The first metallic layer, the second metallic layer, the third metallic layer or the fourth metallic layer is a discontinuous layer. An optional protective overcoat may be applied over the fifth dielectric layer. Optionally, a primer may be applied over the first metallic layer, second metallic layer, third metallic layer and/or fourth metallic layer. In another embodiment, either the second or third metallic layers is a discontinuous layer.

Another embodiment of the invention is a method of making an architectural transparency. The method includes providing a first ply having a number 1 surface and a number 2 surface, providing a second ply having a number 3 surface and a number 4 surface. Either the number 2 surface of the first ply or the number 3 surface of the second ply have the coating described herein. The first ply and the second ply are assembled in a manner so that the number 2 surface faces the number three surface and that there is a space between the number 2 surface and the number 3 surface. The space is filled with a gas. The gas can be air or argon.

In one embodiment, the discontinuous metallic layer is the third metallic layer. In such an embodiment, the coating can have thickness for each layer as described in Table 1, or for each film as described in Table 2. In this embodiment, the third dielectric layer is thicker than the first dielectric layer, the second dielectric layer, the fourth dielectric layer and/or the fifth dielectric layer. The third dielectric layer also comprises the third film.

TABLE 1

Layer Thickness When Discontinuous Metallic layer is the Third Metallic layer

| Layer | Range (Å) | Preferred (Å) | More Preferred (Å) | Most Preferred (Å) |
|---|---|---|---|---|
| $1^{st}$ Dielectric | 250-600 | 300-525 | 325-475 | 353-446 |
| $1^{st}$ Metallic | 50-300 | 60-150 | 70-125 | 70-99 or 78-121 |
| $1^{st}$ Primer | 5-50 | 15-45 | 20-40 | 25-36 |
| $2^{nd}$ Dielectric | 300-1100 | 400-1000 | 475-900 | 504-824 |
| $2^{nd}$ Metallic | 50-300 | 70-250 | 75-200 | 79-191 |
| $2^{nd}$ Primer | 5-50 | 15-45 | 20-40 | 25-36 |
| $3^{rd}$ Dielectric | 75-750 | 100-600 | 150-450 | 199-412 |
| $3^{rd}$ Metallic | 5-30 | 10-25 | 12-22 | 15-19 |
| $3^{rd}$ Primer | 5-50 | 15-45 | 17-40 | 20-36 |
| $4^{th}$ Dielectric | 175-800 | 250-700 | 300-650 | 334-603 |
| $4^{th}$ Metallic | 50-300 | 60-275 | 75-250 | 80-240 |
| $4^{th}$ Primer | 5-50 | 15-45 | 20-40 | 25-36 |
| $5^{th}$ Dielectric | 125-550 | 175-450 | 225-400 | 260-340 |
| Overcoat | 25-75 | 30-60 | 35-55 | 40-50 |

TABLE 2

Film Thickness When Discontinuous Metallic Layer Is The Third Metallic Layer

| Layer | Range (Å) | Preferred (Å) | More Preferred (Å) | Most Preferred (Å) |
|---|---|---|---|---|
| $1^{st}$ Dielectric: $1^{st}$ film | 200-400 | 225-375 | 250-350 | 262-337 |
| $1^{st}$ Dielectric: $2^{nd}$ film | 50-200 | 75-150 | 90-125 | 91-109 |
| $1^{st}$ Metallic | 50-300 | 60-150 | 70-125 | 70-99 or 78-121 |
| $1^{st}$ Primer | 5-50 | 15-45 | 20-40 | 25-36 |
| $2^{nd}$ Dielectric: $1^{st}$ film | 25-150 | 50-125 | 50-100 | 63-90 |
| $2^{nd}$ Dielectric: $2^{nd}$ film | 250-800 | 300-750 | 350-700 | 360-680 |
| $2^{nd}$ Dielectric: $3^{rd}$ film | 25-150 | 50-125 | 75-100 | 81-95 |
| $2^{nd}$ Metallic | 50-300 | 70-250 | 75-200 | 79-191 |
| $2^{nd}$ Primer | 5-50 | 15-45 | 20-40 | 25-36 |
| $3^{rd}$ Dielectric: $1^{st}$ film | 25-200 | 50-150 | 75-125 | 97-105 |
| $3^{rd}$ Dielectric: $2^{nd}$ film | 50-550 | 50-450 | 75-325 | 100-315 |
| $3^{rd}$ Metallic | 5-30 | 10-25 | 12-22 | 15-19 |
| $3^{rd}$ Primer | 5-50 | 15-45 | 17-40 | 20-36 |
| $4^{th}$ Dielectric: $1^{st}$ film | 150-650 | 200-550 | 225-525 | 246-500 |
| $4^{th}$ Dielectric: $2^{nd}$ film | 25-150 | 50-150 | 75-125 | 88-103 |
| $4^{th}$ Metallic | 50-300 | 60-275 | 75-250 | 80-240 |
| $4^{th}$ Primer | 5-50 | 15-45 | 20-40 | 25-36 |
| $5^{th}$ Dielectric: $1^{st}$ film | 25-150 | 50-150 | 75-125 | 90-107 |
| $5^{th}$ Dielectric: $2^{nd}$ film | 100-400 | 125-300 | 150-275 | 170-250 |
| Overcoat | 25-75 | 30-60 | 35-55 | 40-50 |

In another embodiment, the discontinuous metallic layer is the second metallic layer. In such an embodiment, the coating can have thickness for each layer as described in Table 3, or for each film as described in Table 4. In this embodiment, the fourth dielectric layer is thicker than the first dielectric layer, the second dielectric layer, the third dielectric layer and/or the fifth dielectric layer. The fourth dielectric layer also comprises the third film.

TABLE 3

Layer Thickness When The Discontinuous Metallic Layer Is The Second Metallic Layer

| Layer | Range (Å) | Preferred (Å) | More Preferred (Å) | Most Preferred (Å) |
|---|---|---|---|---|
| $1^{st}$ Dielectric | 250-600 | 300-525 | 325-475 | 353-446 |
| $1^{st}$ Metallic | 50-250 | 75-200 | 100-175 | 125-150 |
| $1^{st}$ Primer | 5-50 | 15-45 | 20-40 | 25-36 |
| $2^{nd}$ Dielectric | 225-775 | 300-650 | 350-525 | 400-450 |
| $2^{nd}$ Metallic | 5-30 | 10-25 | 12-22 | 15-19 |
| $2^{nd}$ Primer | 5-50 | 15-45 | 17-40 | 20-36 |
| $3^{rd}$ Dielectric | 175-600 | 225-500 | 260-425 | 300-350 |
| $3^{rd}$ Metallic | 50-300 | 70-250 | 75-200 | 79-191 |
| $3^{rd}$ Primer | 5-50 | 15-45 | 20-40 | 25-36 |
| $4^{th}$ Dielectric | 350-1125 | 475-975 | 615-875 | 690-785 |
| $4^{th}$ Metallic | 50-300 | 60-275 | 75-250 | 80-240 |
| $4^{th}$ Primer | 5-50 | 15-45 | 20-4 | 25-36 |
| $5^{th}$ Dielectric | 125-550 | 175-450 | 225-400 | 260-340 |
| Overcoat | 25-75 | 30-60 | 35-55 | 40-50 |

TABLE 4

Film Thickness When The Discontinuous Metallic Layer Is The Second Metallic Layer

| Layer | Range (Å) | Preferred (Å) | More Preferred (Å) | Most Preferred (Å) |
|---|---|---|---|---|
| $1^{st}$ Dielectric: $1^{st}$ film | 200-400 | 225-375 | 250-350 | 262-337 |
| $1^{st}$ Dielectric: $2^{nd}$ film | 50-200 | 75-150 | 90-125 | 91-109 |
| $1^{st}$ Metallic | 50-250 | 75-200 | 100-175 | 125-150 |
| $1^{st}$ Primer | 5-50 | 15-45 | 20-40 | 25-36 |
| $2^{nd}$ Dielectric: $1^{st}$ film | 25-175 | 50-150 | 50-125 | 75-100 |
| $2^{nd}$ Dielectric: $2^{nd}$ film | 200-600 | 250-500 | 300-400 | 325-350 |
| $2^{nd}$ Metallic | 5-30 | 10-25 | 12-22 | 15-19 |
| $2^{nd}$ Primer | 5-50 | 15-45 | 17-40 | 20-36 |
| $3^{rd}$ Dielectric: $1^{st}$ film | 150-400 | 175-350 | 200-300 | 225-250 |
| $3^{rd}$ Dielectric: $2^{nd}$ film | 25-200 | 50-150 | 60-125 | 75-100 |
| $3^{rd}$ Metallic | 50-300 | 70-250 | 75-200 | 79-191 |
| $3^{rd}$ Primer | 5-50 | 15-45 | 20-40 | 25-36 |
| $4^{th}$ Dielectric: $1^{st}$ film | 25-175 | 50-150 | 75-125 | 90-110 |
| $4^{th}$ Dielectric: $2^{nd}$ film | 300-800 | 400-700 | 500-650 | 550-600 |
| $4^{th}$ Dielectric: $3^{rd}$ film | 25-150 | 25-125 | 40-100 | 50-75 |
| $4^{th}$ Metallic | 50-300 | 60-275 | 75-250 | 80-240 |
| $4^{th}$ Primer | 5-50 | 15-45 | 20-40 | 25-36 |
| $5^{th}$ Dielectric: $1^{st}$ film | 25-150 | 50-150 | 75-125 | 90-107 |
| $5^{th}$ Dielectric: $2^{nd}$ film | 100-400 | 125-300 | 150-275 | 170-250 |
| Overcoat | 25-75 | 30-60 | 35-55 | 40-50 |

The following Examples illustrate various embodiments of the invention. However, it is to be understood that the invention is not limited to these specific embodiments.

Examples

Examples 1-4 were prepared by coating glass with the coating stacks described in Table 5.

TABLE 5

Examples 1-4

| Material Glass | Example 1 Thickness (Å) | Example 2 Thickness (Å) | Example 3 Thickness (Å) | Example 4 Thickness (Å) |
|---|---|---|---|---|
| $Zn_2SnO_4$ | 312 | 301 | 262 | 307 |
| ZnO | 109 | 109 | 91 | 109 |
| Ag | 78 | 81 | 121 | 78 |
| Ti | 35 | 35 | 35 | 35 |
| ZnO | 63 | 63 | 71 | 63 |
| $Zn_2SnO_4$ | 524 | 551 | 463 | 490 |
| ZnO | 81 | 85 | 95 | 84 |
| Ag | 182 | 191 | 128 | 154 |
| Ti | 35 | 36 | 36 | 36 |
| ZnO | 99 | 97 | 105 | 99 |
| $Zn_2SnO_4$ | 296 | 315 | 292 | 200 |
| Ag | 18.8 | 17.1 | 15.75 | 17 |
| $Zn_2SnO_4$ | 296 | 300 | 246 | 340 |
| ZnO | 103 | 102 | 88 | 103 |
| Ag | 188 | 197 | 240 | 181 |
| Ti | 28 | 28 | 28 | 28 |
| ZnO | 90 | 90 | 107 | 90 |
| $Zn_2SnO_4$ | 172 | 170 | 205 | 170 |
| $TiO_2$ | 44 | 44 | 44 | 44 |

In Example 1, the LTA was 34.0, the SHGC was 0.183 and the LSG was 1.86. In Example 2, the LTA was 34.3, the SHGC was 0.178 and the LSG was 1.93. In Example 3, the LTA was 37.3, the SHGC was 0.182 and the LSG was 2.05. In Example 4, the LTA was 40.1, the SHGC was 0.22, and the LSG was 1.82.

Examples 5-7 were prepared by coating glass with the coating stacks described in Table 6.

TABLE 6

Examples 5-7

| Material Glass | Example 5 Thickness (nm) | Example 6 Thickness (nm) | Example 7 Thickness (nm) |
|---|---|---|---|
| $Zn_2SnO_4$ | 30.7 | 33.7 | 31.7 |
| ZnO | 10.9 | 10.9 | 10.9 |
| Ag | 11.2 | 10.7 | 10.7 |
| Ti | 3.5 | 3.5 | 3.5 |
| ZnO | 6.3 | 6.3 | 6.3 |
| $Zn_2SnO_4$ | 42.0 | 36.0 | 68.0 |
| ZnO | 8.1 | 8.1 | 8.1 |
| Ag | 12.4 | 7.9 | 16.4 |
| Ti | 3.6 | 3.6 | 3.6 |
| ZnO | 9.9 | 9.9 | 9.9 |
| $Zn_2SnO_4$ | 20.0 | 10.0 | 20.0 |
| Ag | 1.5 | 1.9 | 1.7 |
| Ti | 2.0 | 3.0 | 3.5 |
| $Zn_2SnO_4$ | 34.0 | 50.0 | 35.0 |
| ZnO | 10.3 | 10.3 | 10.3 |
| Ag | 23.8 | 19.5 | 10.0 |
| Ti | 2.8 | 2.8 | 2.8 |

Example 8 was prepared by coating glass with the coating stack described in Table 7.

TABLE 7

Example 8

| Material Glass | Example 8 Thickness (nm) |
|---|---|
| $Zn_2SnO_4$ | 31.7 |
| ZnO | 10.9 |
| Ag | 13.2 |
| Ti | 3.5 |
| ZnO | 9.0 |
| $Zn_2SnO_4$ | 33.0 |
| Ag | 1.7 |
| $Zn_2SnO_4$ | 24.0 |
| ZnO | 8.0 |
| Ag | 16.4 |
| Ti | 3.6 |
| ZnO | 9.9 |
| $Zn_2SnO_4$ | 57.0 |
| ZnO | 5.4 |
| Ag | 8.0 |
| Ti | 2.8 |
| ZnO | 9.0 |
| $Zn_2SnO_4$ | 21.0 |
| $TiO_2$ | 4.4 |

The invention is further described in the following numbered clauses.

Clause 1: A coated article comprising: a substrate; a first dielectric layer over at least a portion of the substrate; a first metallic layer over at least a portion of the first dielectric layer; an optional first primer over at least a portion of the first metallic layer; a second dielectric layer over at least a portion of the first primer layer; a second metallic layer over at least a portion of the second dielectric layer; an optional second primer over at least a portion of the second metallic layer; a third dielectric layer over at least a portion of the second primer layer; a third metallic layer over at least a portion of the third dielectric layer; an optional third primer over at least a portion of the third metallic layer; a fourth dielectric layer over at least a portion of the third primer layer; a fourth metallic layer over at least a portion of the fourth dielectric layer; and an optional fourth primer over at least a portion of the fourth metallic layer; a fifth dielectric layer over at least a portion of the fourth metallic layer; wherein the first metallic layer, the second metallic layer, the third metallic layer or the fourth metallic layer is a discontinuous layer.

Clause 2: The article of clause 1 wherein the optional first primer, the second primer, the optional third primer or the optional fourth primer is selected from titanium, silicon-aluminum alloys, nickel alloys, alloys containing nickel and chromium, cobalt alloys, alloys containing cobalt and chromium, copper, aluminum, silicon, nickel-chromium alloy, zirconium, mixtures thereof, and alloys thereof.

Clause 3: The article of clause 1 or 2 wherein the optional first primer, the optional second primer, the optional third primer or the fourth primer is deposited as a metal and subsequently oxidized.

Clause 4: The article of any of the clauses 1-3, wherein the discontinuous layer comprises silver or copper.

Clause 5: The article of any of the clauses 1-4, wherein the discontinuous layer comprises silver and copper.

Clause 6: The article of any of the clauses 1-5, wherein the second dielectric layer, or the third dielectric layer comprises a zinc oxide layer, and a zinc stannate layer over the zinc oxide layer.

Clause 7: The article of any of the clauses 1-6 further comprising a protective coating over the fifth dielectric layer.

Clause 8: The article of any of the clauses 1-7 wherein the first dielectric layer, includes an oxide, nitride or oxynitrides of titanium, hafnium, zirconium, niobium, zinc, bismuth, lead, indium, tin, aluminum, silicon or a mixture thereof.

Clause 9: The article of any of the clauses 1-8 wherein the second dielectric layer, includes an oxide, nitride or oxynitride of titanium, hafnium, zirconium, niobium, zinc, bismuth, lead, indium, tin, aluminum, silicon or a mixture thereof.

Clause 10: The article of any of the clauses 1-9 wherein the third dielectric layer, includes an oxide, nitride or oxynitride of titanium, hafnium, zirconium, niobium, zinc, bismuth, lead, indium, tin, aluminum, silicon or a mixture thereof.

Clause 11: The article of any of the clauses 1-10 wherein the fourth dielectric layer, includes an oxide, nitride or oxynitride of titanium, hafnium, zirconium, niobium, zinc, bismuth, lead, indium, tin, aluminum, silicon or a mixture thereof.

Clause 12: The article of any of the clauses 1-11 wherein the fifth dielectric layer, includes an oxide, nitride or oxynitride of titanium, hafnium, zirconium, niobium, zinc, bismuth, lead, indium, tin, silicon, aluminum or a mixture thereof.

Clause 13: The article of any of the clauses 1-12 wherein the first dielectric layer, the second dielectric layer, the third dielectric layer and/or the fourth dielectric layer includes zinc oxide.

Clause 14: The article of any of the clauses 1-13 wherein the first dielectric layer, the second dielectric layer, the third dielectric layer and/or the fourth dielectric layer includes zinc stannate.

Clause 15: The article of any of the clauses 1-14 wherein the fifth dielectric layer includes zinc oxide or zinc stannate.

Clause 16: The article of any of the clauses 1-15 wherein the fifth dielectric layer includes silicon oxide, silicon nitride, silicon oxynitrides or a mixture thereof.

Clause 17: The article of any of the clauses 1-16 wherein the first dielectric layer includes a first film including zinc stannate over the substrate, and a second film including zinc oxide over the first film.

Clause 18: The article of any of the clauses 1-17 wherein the second dielectric layer includes a first film including zinc oxide, and a second film including zinc stannate.

Clause 19: The article of any of the clauses 1-18 wherein the third dielectric layer includes a first film including zinc oxide a second film including zinc stannate and an optional third film including zinc oxide.

Clause 20: The article of any of the clauses 1-19 wherein the fourth dielectric layer includes a first film of zinc stannate and a second film of zinc oxide.

Clause 21: The article of any of the clauses of 1-20 wherein the fifth dielectric layer includes a first film including zinc oxide or zinc stannate.

Clause 22: The article of any of the clauses 1-21 wherein the fifth dielectric layer further includes a second film including silicon oxide, silicon oxynitride, silicon nitride or a mixture thereof.

Clause 23: The article of clause 22 wherein the second film is a gradient layer of silicon oxide to silicon nitride.

Clause 24: The article of clause 22 wherein the second film is a gradient layer of silicon oxynitride to silicon nitride.

Clause 25: The article of any of the clauses 1-24 wherein the first metallic film includes metallic gold, copper, palladium, aluminum, silver, or mixtures, alloys, or combinations thereof.

Clause 26: The article of any of the clauses 1-25 wherein the second metallic film includes metallic gold, copper, palladium, aluminum, silver, or mixtures, alloys, or combinations thereof.

Clause 27: The article of any of the clauses 1-26 wherein the third metallic film includes metallic gold, copper, palladium, aluminum, silver, or mixtures, alloys, or combinations thereof.

Clause 28: The article of any of the clauses 1-27 wherein the fourth metallic film includes metallic gold, copper, palladium, aluminum, silver, or mixtures, alloys, or combinations thereof.

Clause 29: The article of any of the clauses 1-28 wherein the first metallic film includes copper, silver, or a mixture thereof.

Clause 30: The article of any of the clauses 1-29 wherein the second metallic film includes copper, silver, or a mixture thereof.

Clause 31: The article of any of the clauses 1-30 wherein the third metallic film includes copper, silver, or a mixture thereof.

Clause 32: The article of any of the clauses 1-31 wherein the fourth metallic film includes copper, silver, or a mixture thereof.

Clause 33: The article of any of the clauses 1-34 wherein the first primer, the second primer, the third primer and/or the fourth primer includes titanium, aluminum, or a mixture thereof, wherein the primer is deposited as a metal and at least partially oxidized by the deposition of the next layer over the primer.

Clause 34: The article of any of the clauses 1-33 wherein the second metallic layer or the third metallic layer is a discontinuous layer.

Clause 35: The article of clause 34 wherein the discontinuous layer has a thickness of at most 36 Å, preferably at most 26 Å; more preferably at most 20 Å; most preferably at most 19 Å; and at least 5 Å; preferably at least 7 Å; more preferably at least 10 Å; most preferably at least 15 Å.

Clause 36: The article of clauses 34 or 35 wherein the second metallic layer is the discontinuous layer.

Clause 37: The article of clauses 34 or 35 wherein the third metallic layer is the discontinuous layer.

Clause 38: The article of clauses 34, 35, 36 or 37 wherein at least two of the metallic layer are continuous metallic layers.

Clause 39: The article of clauses 34, 35 or 36 wherein the first metallic layer and the fourth metallic layer are continuous metallic layers, wherein the first metallic layer has a thickness of less than 250 Å, preferable less than 200 Å, more preferably less than 125 Å, most preferably less than 100 Å; and/or greater than 50 Å; preferably greater than 60 Å; more preferably greater than 65 Å; most preferably greater than 70 Å; and wherein the fourth metallic layer has a thickness of at least 100 Å, preferably at least 150 Å, more preferably at least 175 Å, most preferably at least 181 Å; and/or at most 300 Å, preferably at most 275 Å, more preferably 250 Å, most preferably at most 240 Å.

Clause 40: The article of clauses 34, 35 or 36 wherein three of the metallic layers are continuous metallic layers.

Clause 41: The article of clause 40 wherein the continuous metallic layers are the first metallic layer, the second metallic layer and the fourth metallic layer wherein the first metallic layer has a thickness of less than 250 Å, preferable less than 200 Å, more preferably less than 125 Å, most preferably less than 100 Å; and/or greater than 50 Å; preferably greater than 60 Å; more preferably greater than 65 Å; most preferably greater than 70 Å; wherein the fourth metallic layer has a thickness of at least 100 Å, preferably at least 150 Å, more preferably at least 175 Å, most preferably at least 181 Å; and/or at most 300 Å, preferably at most 275 Å, more preferably 250 Å, most preferably at most 240 Å; and wherein the second metallic layer has a thickness that is at least 70 Å, preferably at least 100 Å, more preferably at least 125 Å, most preferably at least 128 Å; and/or at most 250 Å, preferably at most 225 Å, more preferably at most 200 Å, most preferably at most 191 Å.

Clause 42: The article of clause 40 wherein the continuous metallic layers are the first metallic layer, the third metallic layer and the fourth metallic layer wherein the first metallic layer has a thickness of less than 250 Å, preferable less than 200 Å, more preferably less than 125 Å, most preferably less than 100 Å; and/or greater than 50 Å; preferably greater than 60 Å; more preferably greater than 65 Å; most preferably greater than 70 Å; and wherein the fourth metallic layer has a thickness of at least 100 Å, preferably at least 150 Å, more preferably at least 175 Å, most preferably at least 181 Å; and/or at most 300 Å, preferably at most 275 Å, more preferably 250 Å, most preferably at most 240 Å.

Clause 43: The article of any of the clauses 34-42 wherein the continuous metallic layer has a thickness in the range of 50 Å to 300 Å, preferably 60 Å to 250 Å, more preferably 65 Å to 225 Å, most preferably between 71 Å to 205 Å.

Clause 44: The article of any of the clauses 1-43 wherein the article has a LTA between 30 and 45, preferably between 32 and 43; more preferably between 33 and 43; most preferably between 34 and 41.

Clause 45: The article of any of the clauses 1-44 wherein the article has a SHGC of between 0.170 and 0.200, preferably between 0.174 and 0.250; more preferably between 0.175 and 0.230; most preferably between 0.178 and 0.220.

Clause 46: The article of any of the clauses 1-45 wherein the article has a LSG between 1.50 and 2.50; preferably between 1.70 and 2.25; more preferably between 1.75 and 2.15; most preferably between 1.82 and 2.05.

Clause 47: A coated article having a substrate; a first dielectric film; a second dielectric film over the first dielectric film; a first metallic film over the second dielectric film comprising silver; a third dielectric film over the first metallic film; a fourth dielectric film over the third dielectric film; a second metallic layer over the fourth dielectric film wherein the second metallic film comprises silver; a fifth dielectric film over the second metallic film; a sixth dielectric film over the fifth dielectric film; a third metallic layer over the sixth dielectric film wherein the third metallic film comprises silver; a seventh dielectric film over the third metallic film; an eighth dielectric film over the seventh dielectric film; a fourth metallic film over the eighth dielectric film wherein the fourth metallic film comprises silver; and a ninth dielectric film over the fourth metallic film; wherein the first metallic film, the second metallic film, the third metallic film or the fourth metallic film is a discontinuous film.

Clause 48: The coated article of clause 47 wherein the first dielectric film includes zinc stannate.

Clause 49: The coated article of any of the clauses 47-48 wherein a plurality of primers is positioned over and in direct contact with each metallic film.

Clause 51: The coated article of any of the clauses 47-50, wherein the second metallic film is the discontinuous layer.

Clause 52: The coated article of any of the clauses 47-50, wherein the third metallic film is the discontinuous layer.

Clause 53: The coated article of any of the clauses 47-52, wherein at least two of the metallic films are continuous layers.

Clause 54: The coated article of any of the clauses 47-52 wherein at least three of the metallic films are continuous layers.

Clause 55: The coated article of any of the clauses 47-54 further comprising a protective layer over the ninth dielectric film.

Clause 56: The article of any of the clauses 47-55 wherein the article has a LTA between 30 and 45, preferably between 32 and 43; more preferably between 33 and 43; most preferably between 34 and 41.

Clause 57: The article of any of the clauses 47-56 wherein the article has a SHGC of between 0.170 and 0.200, preferably between 0.174 and 0.250; more preferably between 0.175 and 0.230; most preferably between 0.178 and 0.220.

Clause 58: The article of any of the clauses 47-57 wherein the article has a LSG between 1.50 and 2.50; preferably between 1.70 and 2.25; more preferably between 1.75 and 2.15; most preferably between 1.82 and 2.05.

Clause 59: A method of making a coated article comprising providing a substrate, applying a first dielectric layer over at least a portion of the substrate, applying a first metallic layer over at least a portion of the first dielectric layer, applying a second dielectric layer over at least a portion of the first metallic layer, applying a second metallic layer over at least a portion of the second dielectric layer, applying a third dielectric layer over at least a portion of the second metallic layer, applying a third metallic layer over at least a portion of the third dielectric layer, applying a fourth dielectric layer over at least a portion of the fourth metallic layer, applying a fifth dielectric layer over at least a portion of the fourth metallic layer; wherein the first metallic layer, the second metallic layer, the third metallic layer or the fourth metallic layer is a discontinuous layer.

Clause 60: The method of clause 59 further comprising applying a protective over coat over at least a portion of the fifth dielectric layer.

Clause 61: The method of clause 59 or 60 further comprising applying a primer layer over at least a portion of the first metallic layer, the second metallic layer, the third metallic layer and/or the fourth metallic layer, wherein the primer layer is applied as a metal and subsequently oxidized upon the application of the next layer.

Clause 62: The method of any of the clauses 59-61 wherein at least the first metallic layer is a continuous metallic layer.

Clause 63: The method of any of the clauses 59-62 wherein at least the fourth metallic layer is a continuous metallic layer.

Clause 64: The method of any of the clauses 59-63 wherein the third metallic layer is a discontinuous metallic layer.

Clause 65: The method of any of the clauses—59-63 wherein the second metallic layer is a discontinuous metallic layer.

Clause 66: An architectural transparency comprising a first ply having a number 1 surface and a number 2 surface, a second ply having a number 3 surface and a number 4 surface, and a coating position over at least a portion of the number 2 surface or the number 3 surface, wherein the coating comprises the coating provided in any of the clauses 1-58.

Clause 67: The architectural transparency according to clause 66 further comprising a space between the number 2 surface and the number 3 surface wherein the space is filled with a gas.

Clause 68: The architectural transparency according to clause 67 wherein the gas is argon.

Clause 69: The architectural transparency according to any of the clauses 66-68 wherein the number 1 surface is configured to face towards the outside of a structure where the architectural transparency is installed.

Clause 70: The architectural transparency according to any of the clauses 66-69 wherein the number 4 surface is configured to face towards the interior of a structure where the architectural transparency is to be installed.

Clause 71: A method of making an architectural transparency comprising providing a first ply having a number 1 surface and a number 2 surface, providing a second ply having a number 3 surface and a number 4 surface, wherein either the number 2 surface of the first ply or the number 3 surface of the second ply comprises a coating as provided in any of the clauses 1-58; assembling the first ply and the second ply in a manner so that the number 2 surface faces the number three surface and that there is a space between the number 2 surface and the number 3 surface wherein the space is filled with a gas.

Clause 72: The method of clause 71 wherein the gas is argon.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coated article comprising:
    a substrate;
    a first dielectric layer comprising zinc and having a thickness in the range of 353 Å to 446 Å over at least a portion of the substrate;
    a first metallic layer comprising silver and having a thickness in the range of 75 Å to 200 Å over at least a portion of the first dielectric layer;
    a first primer layer having a thickness in the range of 25 Å to 36 Å over at least a portion of the first metallic layer;
    a second dielectric layer comprising zinc and having a thickness in the range of 350 Å to 775 Å over at least a portion of the first primer layer;
    a second metallic layer over at least a portion of the second dielectric layer;
    a second primer layer having a thickness in the range of 20 Å to 36 Å over at least a portion of the second metallic layer;
    a third dielectric layer comprising zinc and having a thickness in the range of 260 Å to 425 Å over at least a portion of the second primer layer;
    a third metallic layer comprising silver and having a thickness in the range of 70 Å to 250 Å over at least a portion of the third dielectric layer;
    a third primer layer having a thickness in the range of 25 Å to 36 Å over at least a portion of the third metallic layer;
    a fourth dielectric layer comprising zinc and having a thickness in the range of 350 Å to 785 Å over at least a portion of the third primer layer;
    a fourth metallic layer comprising silver and having a thickness in the range of 80 Å to 240 Å over at least a portion of the fourth dielectric layer;
    a fourth primer layer having a thickness in the range of 25 Å to 36 Å over at least a portion of the fourth metallic layer;
    a fifth dielectric layer comprising zinc and having a thickness in the range of 125 Å to 340 Å over at least a portion of the fourth primer layer; and
    an overcoat comprising titanium and having a thickness in the range of 25 Å to 75 Å over at least a portion of the fifth dielectric layer,
    wherein the second metallic layer is a discontinuous layer comprising silver and having a thickness in the range of 12 Å to 22 Å,
    wherein the first metallic layer, the third metallic layer, and the fourth metallic layer are continuous metallic layers,
    wherein the total thickness of all of the continuous metallic layers is in the range of 225 Å to 650 Å,
    wherein the article comprises a solar heat gain coefficient ("SHGC") of less than 0.20, and
    wherein the article comprises a visible light transmittance ("LTA") of between 34% and 45%.

2. The article of claim 1, wherein the first primer is selected from titanium, silicon-aluminum alloys, nickel alloys, alloys containing nickel and chromium, cobalt alloys, alloys containing cobalt and chromium, copper, aluminum, silicon, nickel-chromium alloy, zirconium, mixtures thereof, and alloys thereof.

3. The article of claim 2, wherein the first primer layer is deposited as a metal and subsequently oxidized.

4. The article of claim 1, wherein the second dielectric layer comprises a zinc oxide layer, and a zinc stannate layer over the zinc oxide layer.

5. The article of claim 1, wherein the third dielectric layer comprises a zinc stannate layer, and a zin oxide layer over the zinc stannate layer.

6. The article of claim 1, wherein the second metallic layer has a thickness in the range of 15 Å to 19 Å.

7. The article of claim 1, wherein the article comprises only one discontinuous layer.

8. The article of claim 1, comprising a LSG between 1.50 and 2.50.

9. The article of claim 1, wherein the first metallic layer has a thickness in the range of from 125 Å to 150 Å.

10. The article of claim 1, wherein the second dielectric layer has a thickness in the range of from 400 Å to 450 Å.

11. The article of claim 1, wherein at least one of the first dielectric layer, the second dielectric layer, the third dielectric layer, the fourth dielectric layer, and the fifth dielectric layer comprises zinc aluminum.

12. The article of claim 1, wherein at least one of the first primer layer, the second primer layer, the third primer layer, and the fourth primer layer comprises aluminum.

13. The article of claim 1, wherein the substrate comprises glass.

14. An architectural transparency comprising:
    a first ply having a number 1 surface and a number 2 surface;
    a second ply having a number 3 surface and a number 4 surface; and
    a coating position over at least a portion of the number 2 surface or the number 3 surface, wherein the coating comprises:
      a first dielectric layer comprising zinc and having a thickness in the range of 353 Å to 446 Å;
      a first metallic layer comprising silver and having a thickness in the range of 75 Å to 200 Å over at least a portion of the first dielectric layer;
      a first primer layer having a thickness in the range of 25 Å to 36 Å over at least a portion of the first metallic layer;

a second dielectric layer comprising zinc and having a thickness in the range of 350 Å to 775 Å over at least a portion of the first primer layer;

a second metallic layer over at least a portion of the second dielectric layer;

a second primer layer having a thickness in the range of 20 Å to 36 Å over at least a portion of the second metallic layer;

a third dielectric layer comprising zinc and having a thickness in the range of 260 Å to 425 Å over at least a portion of the second primer layer;

a third metallic layer comprising silver and having a thickness in the range of 70 Å to 250 Å over at least a portion of the third dielectric layer;

a third primer layer having a thickness in the range of 25 Å to 36 Å over at least a portion of the third metallic layer;

a fourth dielectric layer comprising zinc and having a thickness in the range of 350 Å to 785 Å over at least a portion of the third primer layer;

a fourth metallic layer comprising silver and having a thickness in the range of 80 Å to 240 Å over at least a portion of the fourth dielectric layer;

a fourth primer layer having a thickness in the range of 25 Å to 36 Å over at least a portion of the fourth metallic layer;

a fifth dielectric layer comprising zinc and having a thickness in the range of 125 Å to 340 Å over at least a portion of the fourth primer layer; and an overcoat comprising titanium and having a thickness in the range of 25 Å to 75 Å over at least a portion of the fifth dielectric layer, wherein the second metallic layer is a discontinuous layer comprising silver and having a thickness in the range of 12 Å to 22 Å, wherein the first metallic layer, the third metallic layer, and the fourth metallic layer are continuous metallic layers, wherein the total thickness of all of the continuous metallic layers is in the range of 225 Å to 650 Å, wherein the transparency comprises a solar heat gain coefficient ("SHGC") of less than 0.20, and wherein the transparency comprises a visible light transmittance ("LTA") of between 34% and 45%.

15. The transparency of claim 14, comprising a LSG between 1.50 and 2.50.

16. The transparency of claim 14, wherein the second metallic layer has a thickness in the range of 15 Å to 19 Å.

17. The transparency of claim 14, wherein at least one of the first dielectric layer, the second dielectric layer, the third dielectric layer, the fourth dielectric layer, and the fifth dielectric layer comprises zinc aluminum.

18. The transparency of claim 14, wherein at least one of the first primer layer, the second primer layer, and the third primer layer comprises aluminum.

19. The transparency of claim 14, wherein the second dielectric layer comprises a zinc oxide layer, and a zinc stannate layer over the zinc oxide layer.

20. A method of making a coated article comprising the steps of:

providing a substrate;

applying a first dielectric layer comprising zinc and having a thickness in the range of 353 Å to 446 Å over at least a portion of the substrate;

applying a first metallic layer comprising silver and having a thickness in the range of 75 Å to 200 Å over at least a portion of the first dielectric layer;

applying a first primer layer having a thickness in the range of 25 Å to 36 Å over at least a portion of the first metallic layer;

applying a second dielectric layer comprising zinc and having a thickness in the range of 350 Å to 775 Å over at least a portion of the first primer layer;

applying a second metallic layer over at least a portion of the second dielectric layer;

applying a second primer layer having a thickness in the range of 20 Å to 36 Å over at least a portion of the second metallic layer;

applying a third dielectric layer comprising zinc and having a thickness in the range of 260 Å to 425 Å over at least a portion of the second primer layer;

applying a third metallic layer comprising silver and having a thickness in the range of 70 Å to 250 Å over at least a portion of the third dielectric layer;

applying a third primer layer having a thickness in the range of 25 Å to 36 Å over at least a portion of the third metallic layer;

applying a fourth dielectric layer comprising zinc and having a thickness in the range of 350 Å to 785 Å over at least a portion of the third primer layer;

applying a fourth metallic layer comprising silver and having a thickness in the range of 80 Å to 240 Å over at least a portion of the fourth dielectric layer;

applying a fourth primer layer having a thickness in the range of 25 Å to 36 Å over at least a portion of the fourth metallic layer;

applying a fifth dielectric layer comprising zinc and having a thickness in the range of 125 Å to 340 Å over at least a portion of the fourth primer layer; and applying an overcoat comprising titanium and having a thickness in the range of 25 Å to 75 Å over at least a portion of the fifth dielectric layer, wherein the second metallic layer is a discontinuous layer comprising silver and having a thickness in the range of 12 Å to 22 Å, wherein the first metallic layer, the second metallic layer, and the fourth metallic layer are continuous metallic layers;

wherein the total thickness of all of the continuous metallic layers is within the range of 225 Å to 650 Å;

wherein the article comprises a solar heat gain coefficient ("SHGC") of less than 0.20; and wherein the article comprises a visible light transmittance ("LTA") of between 34% and 45%.

* * * * *

UNITED STATES PATENT AND TRADEMARK OFFICE
CERTIFICATE OF CORRECTION

PATENT NO. : 11,885,174 B2
APPLICATION NO. : 17/391334
DATED : January 30, 2024
INVENTOR(S) : Patrick Fisher et al.

It is certified that error appears in the above-identified patent and that said Letters Patent is hereby corrected as shown below:

In the Claims

Column 20, Line 31, Claim 5, delete "zin" and insert -- zinc --

Signed and Sealed this
Thirtieth Day of April, 2024

Katherine Kelly Vidal
*Director of the United States Patent and Trademark Office*